(12) United States Patent
James (10) Patent No.: US 9,427,048 B2
(45) Date of Patent: Aug. 30, 2016

(54) POLYMERIC COMPONENT WITH INJECTED, EMBEDDED INK AND APPARATUS AND METHOD FOR MANUFACTURING SAME

(71) Applicant: NIKE, Inc., Beaverton, OR (US)

(72) Inventor: Dervin A. James, Hillsboro, OR (US)

(73) Assignee: NIKE, Inc., Beaverton, OR (US)

( * ) Notice: Subject to any disclaimer, the term of this patent is extended or adjusted under 35 U.S.C. 154(b) by 57 days.

(21) Appl. No.: 14/299,274

(22) Filed: Jun. 9, 2014

(65) Prior Publication Data

US 2015/0351499 A1  Dec. 10, 2015

(51) Int. Cl.
| | |
|---|---|
| B05D 5/00 | (2006.01) |
| A43D 95/14 | (2006.01) |
| B29D 35/12 | (2010.01) |
| A43B 1/00 | (2006.01) |
| A43B 13/20 | (2006.01) |
| A43D 8/22 | (2006.01) |
| B41J 3/407 | (2006.01) |
| D06H 1/00 | (2006.01) |
| D06H 1/02 | (2006.01) |
| B29K 75/00 | (2006.01) |
| B29K 23/00 | (2006.01) |
| B29K 105/00 | (2006.01) |

(52) U.S. Cl.
CPC ............ *A43D 95/14* (2013.01); *A43B 1/0027* (2013.01); *A43B 1/0072* (2013.01); *A43B 13/20* (2013.01); *A43D 8/22* (2013.01); *B29D 35/12* (2013.01); *B41J 3/407* (2013.01); *D06H 1/003* (2013.01); *D06H 1/02* (2013.01); *B29K 2023/086* (2013.01); *B29K 2075/00* (2013.01); *B29K 2105/0085* (2013.01); *Y10T 428/2462* (2015.01); *Y10T 428/24628* (2015.01); *Y10T 428/24876* (2015.01)

(58) Field of Classification Search
CPC .... A43D 95/14; B29D 35/12; A43B 1/0027; D06H 1/003
See application file for complete search history.

(56) References Cited

U.S. PATENT DOCUMENTS

| | | | |
|---|---|---|---|
| 3,057,098 A | 10/1962 | Gabriel | |
| 3,258,775 A | 6/1966 | Munz | |
| 3,405,213 A | 10/1968 | Munz | |

(Continued)

FOREIGN PATENT DOCUMENTS

| | | |
|---|---|---|
| BR | PI0603484 A | 2/2008 |
| FR | 2620974 A1 | 3/1989 |

(Continued)

*Primary Examiner* — Nathan Empie
(74) *Attorney, Agent, or Firm* — Quinn Law Group, PLLC (57) ABSTRACT

An article, such as an article of footwear, includes a polymeric component that has a first surface, a second surface, and a thickness between the first surface and the second surface. The article has ink injected into the polymeric component at a predetermined depth from the first surface such that the ink is embedded in the polymeric component at least partially between the first surface and the second surface. The polymeric component includes multiple layers. The ink is embedded in at least one of the layers. An apparatus for establishing a graphical image on a polymeric component includes a support frame, a jig connected to the support frame and configured to hold the polymeric component, and the needle. A method for manufacturing an article includes inserting a needle into a polymeric component, and injecting ink through the needle so that the ink provides a graphical image.

36 Claims, 7 Drawing Sheets

(56) References Cited

U.S. PATENT DOCUMENTS

| | | | |
|---|---|---|---|
| 3,563,782 A | 2/1971 | Liberman et al. | |
| 4,183,156 A | 1/1980 | Rudy | |
| 4,219,945 A | 9/1980 | Rudy | |
| 4,719,825 A * | 1/1988 | LaHaye | A01K 11/005 222/390 |
| 4,906,502 A | 3/1990 | Rudy | |
| 4,936,029 A | 6/1990 | Rudy | |
| 5,042,176 A | 8/1991 | Rudy | |
| 5,713,141 A | 2/1998 | Mitchell et al. | |
| 5,952,065 A | 9/1999 | Mitchell et al. | |
| 6,013,340 A | 1/2000 | Bonk et al. | |
| 6,082,025 A | 7/2000 | Bonk et al. | |
| 6,127,026 A | 10/2000 | Bonk et al. | |
| 6,203,868 B1 | 3/2001 | Bonk et al. | |
| 6,321,465 B1 | 11/2001 | Bonk et al. | |
| 6,837,951 B2 | 1/2005 | Rapaport | |
| 6,983,554 B2 | 1/2006 | Watkins | |
| 8,061,060 B2 | 11/2011 | Swigart et al. | |
| 2006/0213084 A1 | 9/2006 | Scales | |
| 2007/0000605 A1 | 1/2007 | Millette et al. | |
| 2011/0109686 A1 | 5/2011 | McDowell et al. | |
| 2014/0271897 A1 * | 9/2014 | Pathak | A61K 9/5031 424/497 |

FOREIGN PATENT DOCUMENTS

| | | | | |
|---|---|---|---|---|
| FR | 2847433 A1 | 5/2004 | | |
| FR | 2848574 A1 | 6/2004 | | |
| FR | 2958066 A1 * | 9/2011 | | G09B 11/06 |
| JP | 2008126536 A | 6/2008 | | |

* cited by examiner

POLYMERIC COMPONENT WITH INJECTED, EMBEDDED INK AND APPARATUS AND METHOD FOR MANUFACTURING SAME

TECHNICAL FIELD

The present disclosure relates to a polymeric component, such as for an article of footwear, and an apparatus and method for manufacturing the polymeric component.

BACKGROUND

Articles of footwear, athletic apparel, sports equipment, and other components related to athletics often include polymeric components. Manufacturers sometimes include designs, logos, or other graphical images on the polymeric components, such as by printing on the surface of the polymeric component, or adhering the graphical image to the polymeric component. It is desirable to ensure durability of the graphical image throughout the useful life of the polymeric component.

SUMMARY

An article, such as an article of footwear, includes a polymeric component that has a first surface, a second surface, and a thickness between the first surface and the second surface. The article has ink injected into the polymeric component at a predetermined depth from the first surface such that the ink is embedded in the polymeric component at least partially between the first surface and the second surface. The polymeric component includes multiple layers. The ink is embedded in at least one of the layers. With the ink injected in this manner, a graphical image provided by the ink is durable, and is not removed when an outer surface of the component is scuffed, as may occur when ink is printed only on the surface of a component.

In one aspect of the present teachings, the polymeric component may be a substantially transparent material, and the ink may be injected in the polymeric component in a manner to provide a graphical image. In one example, the ink may be colored, so that the colored graphical image established by the ink may be visible in the polymeric component. In some embodiments, multiple colors of ink are used.

The polymeric component may be a component of an article of footwear, but is not limited to such. For example, the polymeric component may be a bladder element of an article of footwear, such as a bladder element that seals an internal cavity bounded by the second surface of the wall. For example, the bladder element may be a fluid-filled bladder element that retains fluid in the internal cavity. As used herein, a "fluid" retained in the internal cavity of the bladder element is a gas, such as nitrogen or air. As such, a "fluid-filled bladder element" is a bladder element filled with a gas, such as nitrogen or air. Alternatively, the polymeric component may be a different component of an article of footwear.

One of the multiple layers of the polymeric component may be a barrier layer impermeable to a fluid retained in the cavity. The barrier layer may be positioned within the polymeric component at a depth not less than the predetermined depth such that the barrier layer remains impermeable to the fluid and is unaffected by the injected ink or by a process of injecting the ink.

The multiple layers of the polymeric component may include a first layer defining the first surface and a second layer defining the second surface. The barrier layer is between the first layer and the second layer. The thickness of the first layer is at least as great as the predetermined depth at which the ink is injected. Accordingly, the ink is not injected into the barrier layer, and a needle used to inject the ink does not pierce or compromise the barrier layer. In one embodiment, the first and second layers are thermoplastic polyurethane, and the barrier layer is a copolymer of ethylene and vinyl alcohol.

The polymeric component may have pierced holes extending from the first surface and partway through the polymeric component. The pierced holes may be at least partially filled with the ink. The pierced holes can be created by an injecting needle that injects the ink, by a piercing needle that pierces the polymeric component prior to injection of the ink by the injecting needle, or by both. As such, the pierced holes extend from the first surface and partway through the polymeric component. For example, in an embodiment with the barrier layer, the pierced holes do not extend into the barrier layer. The pierced holes are at least partially filled with the injected ink. The ink may dry completely within the pierced holes, or may initially extend out of the pierced holes onto the first surface when injected, and be wiped from the first surface.

The polymeric component may be injected into a curved portion of the polymeric component, into a substantially flat portion of the polymeric component, or both. In some embodiments, one or more additional graphical images may be provided by injecting ink in a different region of the polymeric component so that the ink is embedded in the polymeric component to a depth extending at least partially between the first surface and the second surface of the polymeric component at the different region of the polymeric component.

An article of footwear may include a polymeric bladder element having a first layer with a curved outer surface, a second layer with a curved inner surface, and at least one barrier layer between the first layer and the second layer. The polymeric bladder element seals an internal cavity bounded by the curved inner surface. The barrier layer is impermeable to a fluid contained within the cavity. Ink is injected in the first layer between the curved outer surface and the barrier layer to a depth not extending into the barrier layer so that the ink provides a graphical image in the polymeric component and so that the impermeability of the barrier layer is unaffected by injection of the ink. In one embodiment, the barrier layer is a laminate membrane having alternating layers of polyurethane, and layers that include a copolymer of ethylene and vinyl alcohol. In one non-limiting example, the polymeric component has a thickness of not less than 0.065 inches, and the depth of the ink is at least 0.015 inches.

An apparatus for creating a graphical image on a polymeric component may include a support frame. A jig that is configured to hold the polymeric component may be connected to the support frame. A needle is operatively supported by the support frame and is movable to pierce the polymeric component and inject ink into the polymeric component. The ink is injected at a predetermined depth to establish a graphical image on the polymeric component when the polymeric component is held in the jig. An additional needle may be operatively supported by the frame and movable to pierce the polymeric component and inject ink into the polymeric component at to establish an additional graphical image on the polymeric component when the polymeric component is held in the jig.

The apparatus may include a controller and at least one actuator operatively connected to the controller and to the needle. The controller may have a stored algorithm that establishes at least one of a rate of insertion of the needle into the polymeric component and a pressure of insertion of the needle into the polymeric component. The stored algorithm of the controller may include a predetermined pattern by which the needle pierces the polymeric component.

The apparatus may include an ink source operatively connected to the needle from which ink is supplied to the needle. A flow valve may be operable to regulate the rate of flow of ink from the ink source through the needle. The flow valve may be controlled by the controller.

A method for manufacturing an article includes inserting at least one needle into a polymeric component that includes multiple layers to a depth less than the thickness of the component so that the needle does not penetrate entirely through the component. Ink is then injected into the polymeric component through the needle into at least a portion of the polymeric component so that the ink is embedded in at least one of the layers as a graphical image in the portion of the component.

Optionally, the rate of insertion of the needle may be at a controlled or predetermined rate. Insertion of the needle may be at a controlled or predetermined pressure of the needle against the polymeric component. Additionally, the rate of flow of ink from the needle may be at a controlled or predetermined rate.

The method may include piercing a predetermined pattern in the polymeric component, and then inserting the needle used to inject the ink after piercing the predetermined pattern. For example, the needle used to inject the ink may be inserted within the pierced, predetermined pattern. In a further non-limiting example, the ink-injecting needle may have a first diameter, and the piercing of the predetermined pattern prior to inserting the ink injecting needle may be via at least one second needle that has a second diameter larger than the first diameter. Alternatively, the ink injecting needle alone can be used to pierce the polymeric component when injecting the ink or otherwise, and according to the predetermined pattern or otherwise. Pierced openings in the polymeric component are completely or partially filled with the ink of the injecting needle or needles. The method may include wiping any ink off of the surface of the polymeric component so that the remaining ink is only in the pierced openings.

Under the method, multiple colors of ink can be injected to establish a single or multiple graphical images, and the multiple colors may be injected sequentially, such as by the same needle, or simultaneously, such as by different needles at different portions of the polymeric component.

In an embodiment in which the polymeric component is a bladder element, the method may include inflating the bladder element with a fluid such as air or nitrogen either prior to or after inserting the ink-injecting needle.

The method may include determining that a predetermined ink drying time has elapsed after injecting the ink, such as via a timer of a controller. The method may include moving the polymeric component after the predetermined ink drying time has elapsed. Ink can then be injected into the polymeric component at a different region of the polymeric component through the same or a different ink-injecting needle after the polymeric component is moved.

The method may include holding the polymeric component in a jig while the ink is injected. A controller then determines whether a predetermined ink drying time has elapsed after the ink is injected. The polymeric component is removed from the jig only after the predetermined ink drying time has elapsed.

The method may include thermoforming the polymeric component, such as in an embodiment in which the polymeric component is a bladder element for an article of footwear, in which case the bladder element may be thermoformed in a mold assembly. Under the method, it may be determined by a controller whether a predetermined cooling time has elapsed after the bladder element is thermoformed. The thermoformed bladder element may then be removed from the mold assembly after the predetermined cooling time has elapsed. The ink-injecting needle may be inserted in the bladder element, and ink injected through the ink injecting needle, such as when the bladder element is placed in a jig.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively for the figures, and do not represent limitations on the scope of the invention, as defined by the claims.

The above features and advantages and other features and advantages of the present disclosure are readily apparent from the following detailed description of the best modes for carrying out the concepts of the disclosure when taken in connection with the accompanying drawings.

DETAILED DESCRIPTION

Figure 1:
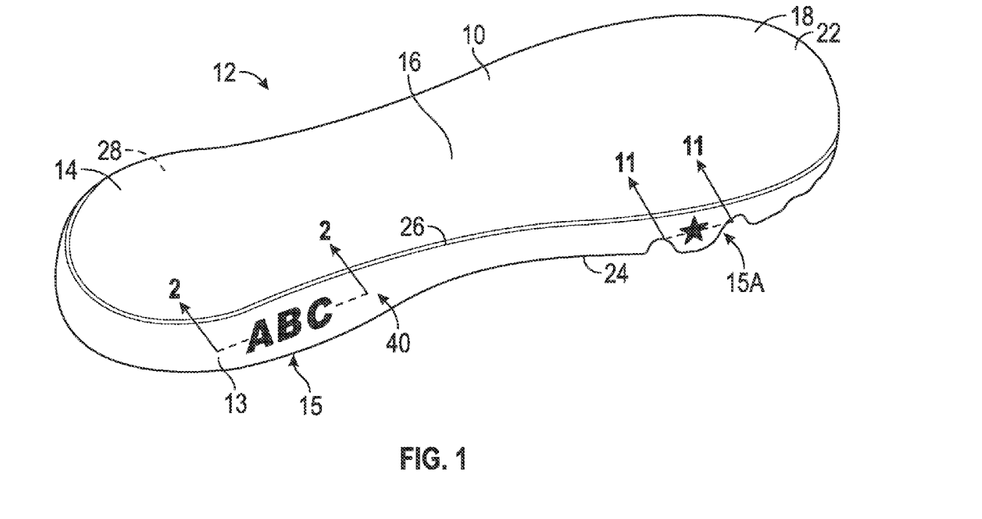
FIG. 1 is a schematic illustration in perspective view of an embodiment of a polymeric bladder element for an article of footwear having a graphical image.

Referring to the drawings, wherein like reference numbers refer to like components throughout the several views, FIG. 1 is a perspective view of an embodiment of a polymeric component 10 for an article of footwear 12. As further explained in detail herein, the polymeric component 10 has a wall 13 into which ink is injected through a needle so that the ink is embedded within the wall 13. The ink establishes a graphical image 15 that is resistant to scuff and wear because it is embedded within the wall 13 rather than applied to an outer surface of the wall 13. As used herein, a "wall" is any solid portion of the polymeric component, and is bounded by first and second opposing surfaces. The wall need not be planar or flat in shape.

More specifically, in the embodiment shown, the polymeric component 10 is a fluid-filled bladder element, and is referred to herein as such. The fluid-filled bladder 10 element is configured as a full-length bladder element, as it has a heel portion 14, a midfoot portion 16, and a forefoot portion 18 configured to lay under the corresponding portions of a human foot of a size corresponding with the bladder element 10. The bladder element 10 can be supported by and secured to one or more midsole or outsole layers of the article of footwear 12. In other embodiments, the polymeric component could be another polymeric component of an article of footwear, such as an insert or plate applied to an upper, a cushioning component or other polymeric component of an article of apparel, a cushioned strap of a carrying bag, or a polymeric component of sports equipment such as a sports ball.

Figure 5:
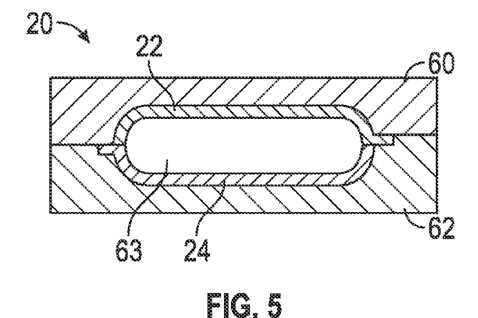
FIG. 5 is a schematic illustration in cross-sectional view of a mold assembly thermoforming the bladder element of FIG. 1.
Figure 6:
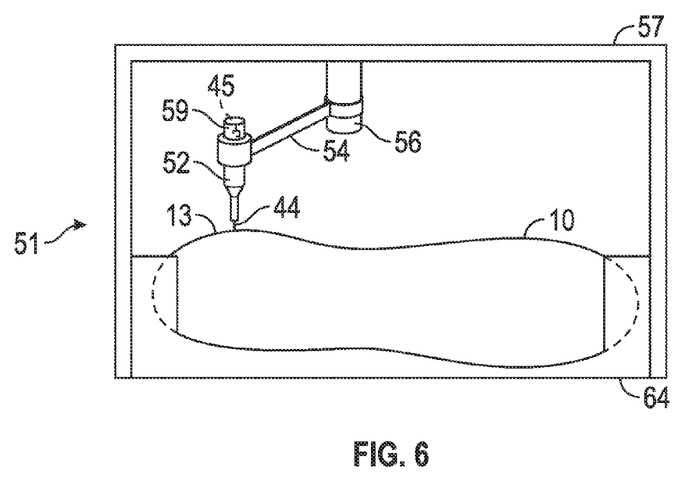
FIG. 6 is a schematic illustration in side view of a jig holding the bladder element while the piercing needle outlines the predetermined pattern.

The bladder element 10 is thermoformed in a mold assembly 20 shown in FIG. 5 from an upper sheet 22 and a lower sheet 24. Once thermoformed, the sheets 22, 24 are bonded to one another at a peripheral flange 26 to form a fluid-filled internal cavity 28 therebetween. The bladder element 10 can be formed from a variety of polymeric materials that can resiliently retain a fluid such as nitrogen, air, or another gas. Examples of polymeric materials for the bladder element 10 include thermoplastic urethane, polyurethane, polyester, polyester polyurethane, and polyether polyurethane. Moreover, the bladder element 10 can be formed of layers of different materials including polymeric materials. In one embodiment, the bladder element 10 is formed from thin films having one or more thermoplastic polyurethane layers with one or more barrier layers of a copolymer of ethylene and vinyl alcohol (EVOH) that is impermeable to the pressurized fluid contained therein as disclosed in U.S. Pat. No. 6,082,025, which is incorporated by reference in its entirety. Bladder element 10 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 10 may also be a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Additional suitable materials for the bladder element 10 are disclosed in U.S. Pat. Nos. 4,183,156 and 4,219,945 to Rudy which are incorporated by reference in their entireties. Further suitable materials for the bladder element 10 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 10, engineering properties such as tensile strength, stretch properties, fatigue characteristics, dynamic modulus, and loss tangent can be considered. The thicknesses of sheets of materials used to form the bladder element 10 can be selected to provide these characteristics.

The bladder element 10 is resilient and provides cushioning and flexibility that can be tuned such as by selecting a level of pressurization. Tensile members and/or reinforcing structures can be integrated with the bladder element 10 to provide desired responsiveness, such as disclosed in U.S. Pat. No. 4,906,502 to Rudy et al., and U.S. Pat. No. 8,061,060 to Swigart et al., which are incorporated by reference in their entireties.

Figure 2:
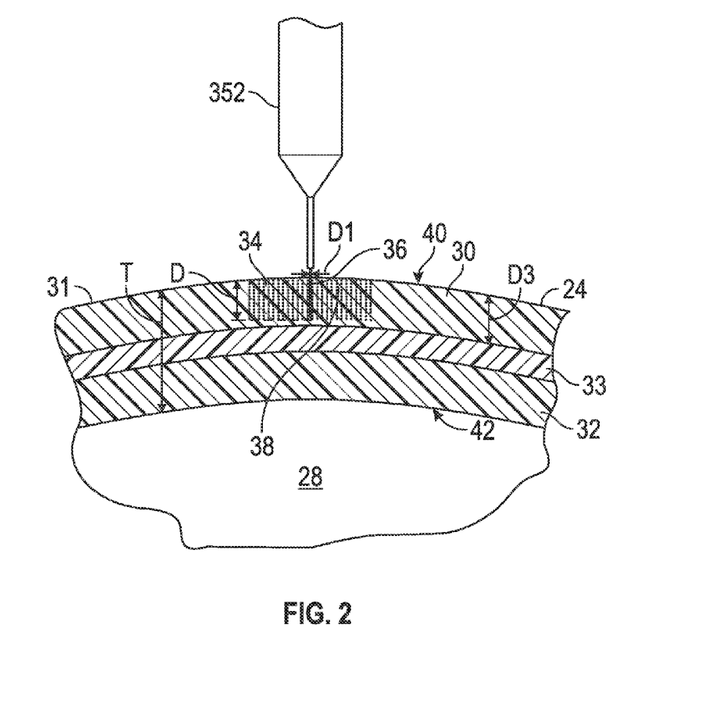
FIG. 2 is schematic illustration in fragmentary partially cross-sectional view taken at lines 2-2 in FIG. 1 of a needle injecting ink into a curved portion of the bladder element to establish the graphical image.

FIG. 2 shows a portion of the lower sheet 24 that forms the wall 13. The sheet 24 is turned approximately 90 degrees in FIG. 2 relative to FIG. 1 for positioning to receive an injection of ink 34. The lower sheet 24 has multiple layers. For purposes of illustration, the wall 13 is shown as a three layer bladder element having a first layer 30 of thermoplastic polyurethane, a second layer 32 of thermoplastic polyurethane, and a barrier layer 33 between the first and second layers 30, 32. The first layer 30 may be referred to as an outer layer, as it has a first surface 40 that is the outer surface of the bladder element 10, and the second layer 32 may be referred to as an inner layer, as it has a second surface 42 that is the inner surface of the bladder element. The outer surface 40 is exposed on the bladder element 10, and the inner surface 42 bounds the internal cavity 28. Sheet 22 has similar layers 30, 32, 33.

The barrier layer 33 includes an ethylene-vinyl alcohol copolymer that is impermeable to a fluid within the cavity 28, such that the fluid cannot pass through the barrier layer 33 and is retained within the cavity 28. In one embodiment, the barrier layer 33 can be a laminate membrane having alternating layers of thermoplastic polyurethane and layers of an ethylene-vinyl alcohol copolymer.

Figure 11:
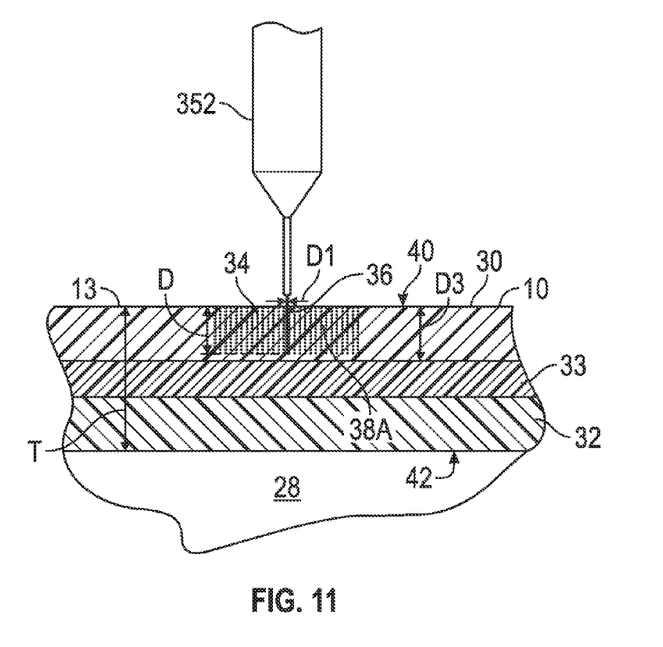
FIG. 11 is schematic illustration in fragmentary partially cross-sectional view taken at lines 11-11 in FIG. 1 of a needle injecting ink into a flat portion of the bladder element to establish the graphical image.
Figure 12:
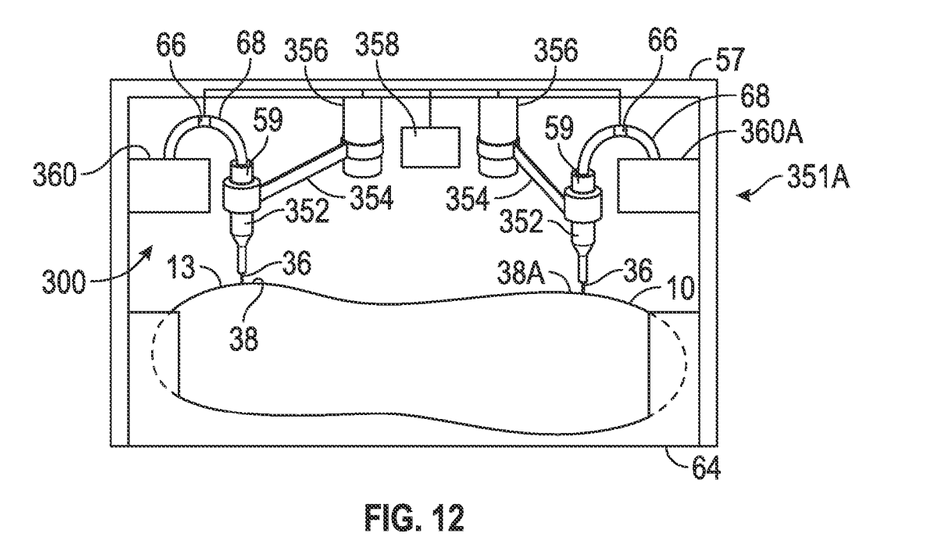
FIG. 12 is a schematic illustration in side view of the jig holding the bladder element while multiple injecting needles inject ink into the bladder element.

FIG. 2 shows the injection of ink 34 by a needle 36. As illustrated, the ink 34 is injected in a first region 38 of the wall 13 in a manner to provide the graphical image 15 of FIG. 1. As shown, the first region 38 is also referred to as a curved portion 38 of the bladder element 10. Alternatively or in addition, the ink 34 can be injected into a flat portion 38A of the bladder element 10, as shown in FIG. 11, creating graphical image 15A. The ink 34 injected at the curved portion 38 and at the flat portion 38A may be the same or different colors. The same needle 36 may be used to inject the ink 34 at multiple portions, such as at both portions 38, 38A in a sequential manner, or different needles 36 may be used for injecting ink 34 at the different portions 38, 38A, in which case the injection of ink at portions 38, 38A may be done sequentially or simultaneously. If multiple ink injecting needles 36 are used, they may be single needles 36, or clusters of needles 36, similar to needles 44 in FIG. 4. FIG. 12 shows multiple single needles 36 simultaneously injecting ink at the portions 38, 38A.

With reference again to FIGS. 1 and 2, the layers 30, 32, 33 of both sheets 22, 24 are a substantially transparent material. As used herein, a component is "substantially transparent" when it is sufficiently transparent to allow at least some light to pass through, thereby allowing visibility therethrough. A substantially transparent item may be translucent, and may be clear or may have a tinted color. The ink 34, however, is colored. The first region 38 and the graphical image 15 will therefore appear colored. The region 38A and the graphical image 15A will also be colored, as will the graphical image 115 discussed with respect to FIGS. 9 and 10. As used herein, colored ink includes black ink, white ink, and all other colors of ink. Different colors of ink may be injected into the sheet 24 to establish the first image 15, in a sequential manner, using one or more needles 36, or different colors of ink may be injected into the sheet 24 in a simultaneous manner using multiple needles 36.

The ink 34 is embedded within the outer layer 30, and is not simply applied to the outer surface 40. In the embodiment shown, the thickness T of the sheet 24 between the outer surface 40 and the inner surface 42 is at least 0.065 inches, although other ranges of thicknesses may be used in other embodiments. The needle 36 is inserted through the outer surface 40 into the outer layer 30 to a predetermined depth D not greater than a thickness D3 of the first layer 30. In one embodiment, the predetermined depth D is 0.015 inches, although other ranges of depths may apply in other embodiments. The barrier layer 33 is positioned within the polymeric component 10 such that it begins at the depth D3. In other words, the barrier layer 33 abuts the first layer 30, and the interface of the first layer 30 and the barrier layer 33 is at the depth D3. Because the needle 36 is inserted only to the predetermined depth D, the barrier layer 33 is not affected by or compromised by the needle 36, by the ink 34 injected through the needle 36, or by the process of injecting the ink 34. The barrier layer 33 thus remains impermeable to the fluid retained in the cavity 28.

Figure 13:
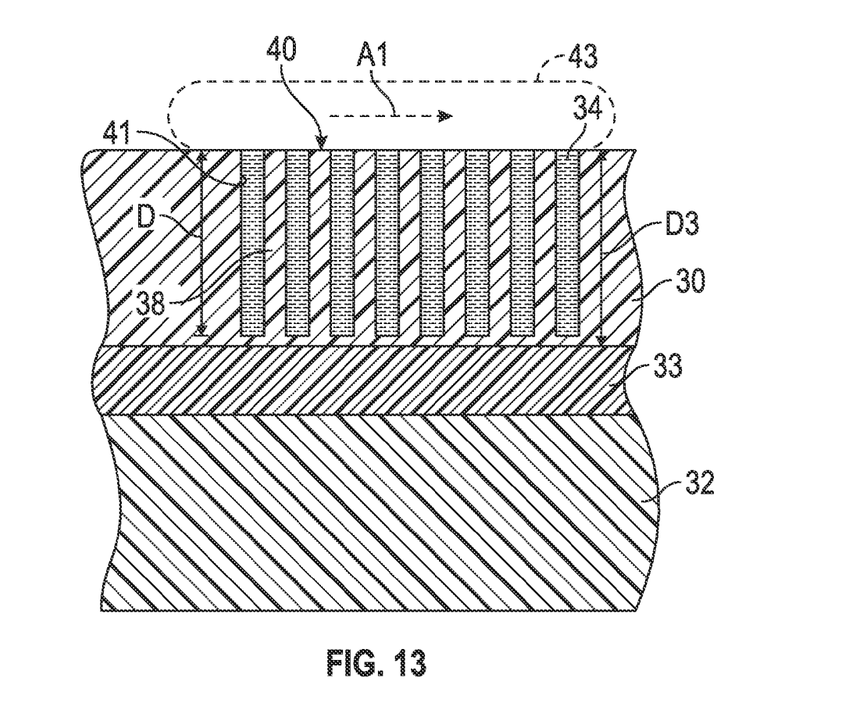
FIG. 13 is a schematic illustration in fragmentary cross-sectional view of a portion of the bladder element after ink injection and showing pierced openings filled with the ink and showing a wiping tool in phantom.

FIG. 13 shows that the first layer 30 has a plurality of pierced holes 41 created by insertion of the needle 36 and/or the needle 44. The pierced holes 41 extend only to the predetermined depth D, so that none of the pierced holes extend beyond the depth D3. The injected ink 34 fills the pierced holes 41. None of the ink 34 is present on the surface 40 after the ink dries. This may be due to the ink 34 shrinking slightly inward into the holes 41 upon drying. Additionally, if some ink 34 is on the surface 40 after injection of the ink 34 into the openings 41, a wiping tool 43, shown in phantom, can be moved across the surface 40, as indicated by arrow A1, to absorb and wipe any excess ink 34 from the surface 40 prior to the ink 34 drying. The ink 34 is thus contained in the pierced holes 41 of the layer 30. Because the ink 34 is embedded relatively deep within the layer 30 when the ink 34 dries, the graphical image 15 should be very durable, as it should remain even if the outer surface 40 in the region 38 is scuffed.

Figure 3:
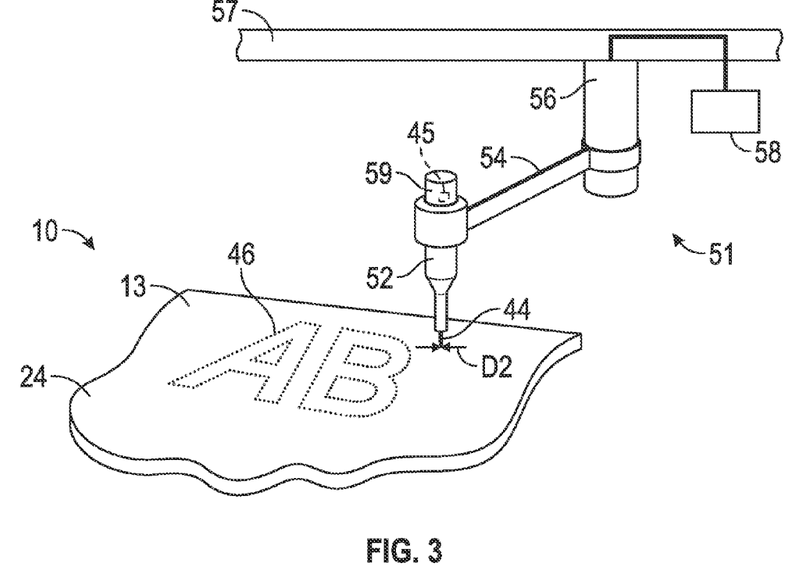
FIG. 3 is a schematic illustration in fragmentary perspective view of a piercing needle controlled by a robotic arm to pierce an outline of a predetermined pattern for the graphical image of the bladder element.
Figure 4:
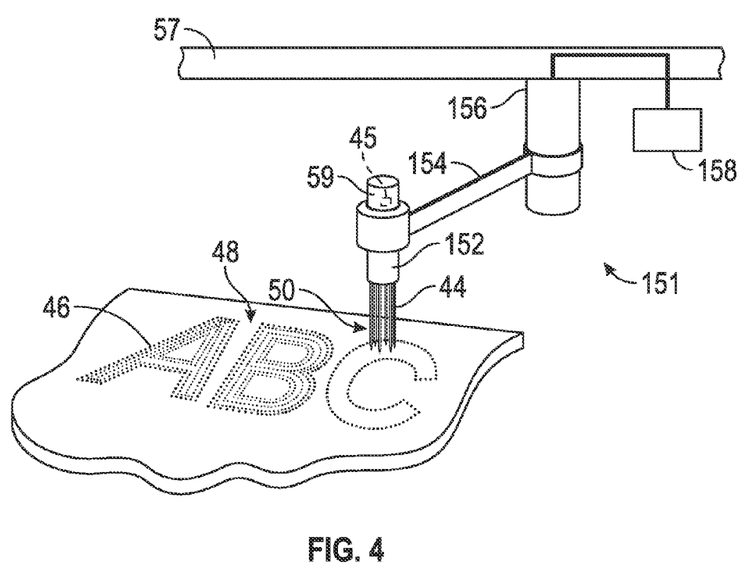
FIG. 4 is a schematic illustration in fragmentary perspective view of a cluster of piercing needles piercing the predetermined pattern for the graphical image within the outline.

FIGS. 3-7 show optional preparatory steps in manufacturing the bladder element 10 prior to injecting the ink 34 with the needle 36 as shown in FIGS. 2, 8, 9, 11, and 12. Specifically, FIG. 3 shows a piercing needle 44 in the process of piercing an outline 46 generally coincidental with the boundaries of the graphical image 15 of FIG. 1. The piercing needle 44 is also referred to herein as a second needle. The piercing needle 44 has a diameter D2 that is larger than a diameter D1 of the injection needle 36 of FIG. 2. In other embodiments, the piercing needle 44 could have a smaller diameter or the same size diameter as the injection needle 36. The pierced outline 46 is part of an entire predetermined pierced pattern 48, shown in FIG. 4, which may be pierced in the wall 13 prior to injection of the ink 34. In FIG. 4, a cluster 50 of piercing needles 44 is used to complete the piercing of the predetermined pattern 48 within the outline 46. Using the cluster 50 of piercing needles 44 helps to minimize the time required to create the predetermined pierced pattern 48 in comparison to using only one piercing needle 44. However, the predetermined pierced pattern 48 can instead be established by a single needle 44, such as the same piercing needle 44 of FIG. 3 used to create the pierced outline 46. Pre-piercing the predetermined pattern 48 with the needle 44 or cluster 50 of needles 44 may lessen the required insertion force of the needle 36, especially if the diameter D2 of the needle 44 or cluster of needles is greater than the diameter D1 of the needle 36. Alternatively, the ink can be injected by the needle 36 according to the predetermined pattern to create the graphical image 15 without any pre-piercing of the predetermined pattern.

FIG. 3 shows a portion of an apparatus 51 for creating a graphical image on a polymeric component, such as bladder element 10. The needle 44 is supported by a needle housing 52 held by a robotic arm 54. The robotic arm 54 is movable by an actuator 56, and the needle 44 is separately movable by an actuator 59 supported by the housing 52. Both actuators 56, 59 are moved under the control of an electronic controller 58 according to a stored algorithm of a series of movements to establish the pierced outline 46, and a controlled needle insertion depth, and optionally a controlled rate of insertion, and force of insertion (or insertion pressure). The actuator 56 is supported by a frame 57. The actuators 56, 59 can be electrically, hydraulically, or pneumatically actuated to move vertically, horizontally, and rotatably according to the stored algorithm. For example, the actuator 59 may be electromagnetic coils that are energized in a manner to move an armature connected to the needle 44, or the actuator 59 may be a an electrically powered rotor. Any suitable robotic system can be used to move the needle 44 in a controlled manner, and the robotic arm 54, actuators 56, 59, and the controller 58 are only one example of such a system. Optionally, a sensor 45 capable of sensing a parameter indicative of an insertion pressure of the needle 44, such as a force sensor, may be supported by the housing 52 and in operative communication with the actuator 59 and the needle 44 to sense insertion pressure. The sensor 45 is also operatively connected to the controller 58, and sends a sensor signal to the controller 58. If the signal indicates that the insertion pressure is too great, the controller 58 adjusts the insertion pressure by adjusting the force applied by the actuator 59 to the needle 44. Alternatively, instead of being controlled with feedback of insertion pressure to the controller 58 in this manner, the actuator 59 can simply be controlled to apply a predetermined downward force correlated with a predetermined insertion pressure of the needle 44.

FIG. 4 shows an alternative apparatus 151 with the cluster 50 of piercing needles 44 supported by a needle housing 152 held by a robotic arm 154. An actuator 59 as shown and described with respect to FIG. 3, including the sensor 45, is supported by the housing 152. The robotic arm 154 is movable by an actuator 156 and the needles 44 are separately movable by the actuator 59 under the control of an electronic controller 158 according to a stored algorithm of a series of movements to establish the remaining piercings of the predetermined pierced pattern 48 within the pierced outline 46. The actuators 59, 156 can be electrically, hydraulically, or pneumatically actuated to move vertically, horizontally, and rotatably according to the stored algorithm that controls needle insertion depth, and optionally a controlled rate of insertion, and force of insertion (or insertion pressure). The actuator 156 is supported by a frame 57. Any suitable robotic system can be used to move the cluster 50 of needles 44, and the robotic arm 154, actuator 59, 156, and controller 158 are only one example of such a system.

Figure 14:
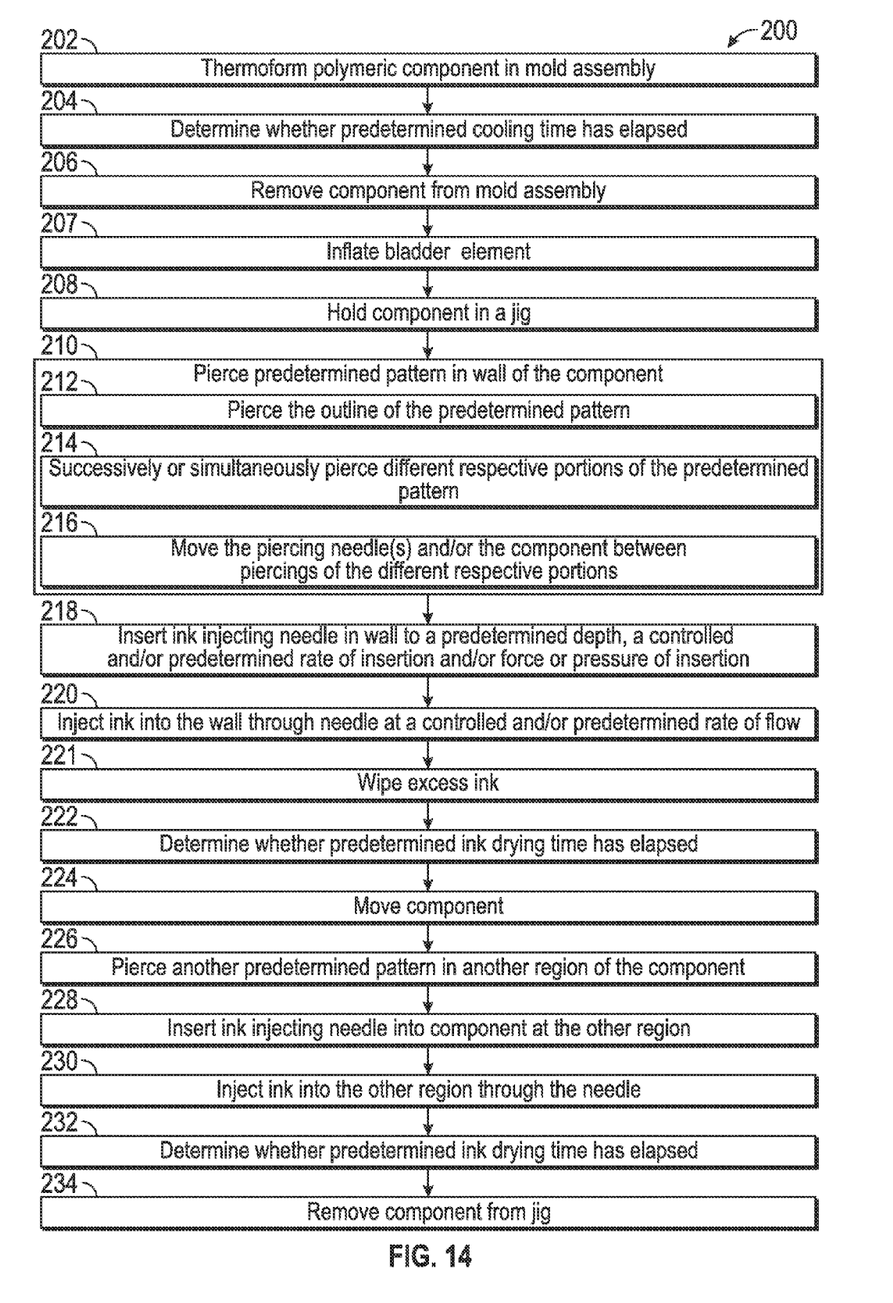
FIG. 14 is a flow diagram of a method for manufacturing the bladder element of FIGS. 1-13.

FIGS. 5-10 show the various processes in the order of one example method for manufacturing 200 illustrated in the flow diagram of FIG. 14. The method 200 begins with step 202, thermoforming the polymeric component 10 in the mold assembly 20. In the embodiment shown, the polymeric component is the bladder element 10, thermoformed from the upper sheet 22 and the lower sheet 24. The mold assembly 20 has a first mold tool 60 and a second mold tool 62 configured to be closed together to form a mold cavity 63 that allows thermoforming of the originally flat sheets 22, 24 to establish the shape of the bladder element 10. Other mold cavities may be used within the scope of the present teachings. After a predetermined cooling time has elapsed, as determined in step 204 by a timer accessed by an algorithm of a controller operatively connected to the mold assembly 20, the thermoformed bladder element 10 is removed from the mold assembly 20 in step 206. Optionally, in step 207, the internal cavity 28 of the bladder element 10 may be partially or completely inflated with fluid prior to piercing and/or ink insertion. Alternatively, inflation of the bladder element 10 may occur after the ink injection process. Inflating the bladder element 10 prior to ink injection enables the outer surface 40 of the bladder element 10 to be in its final intended shape, including any curvature, prior to establishment of the graphical image 15. A greater needle insertion force may be required to insert the needles 36 and 44 into the outer layer 30 if the bladder element 10 is fully inflated, however. Conducting some or all of the inflation of the bladder element 10 after the ink insertion may enable a lower insertion force of the needle 36 or 44.

Figure 7:
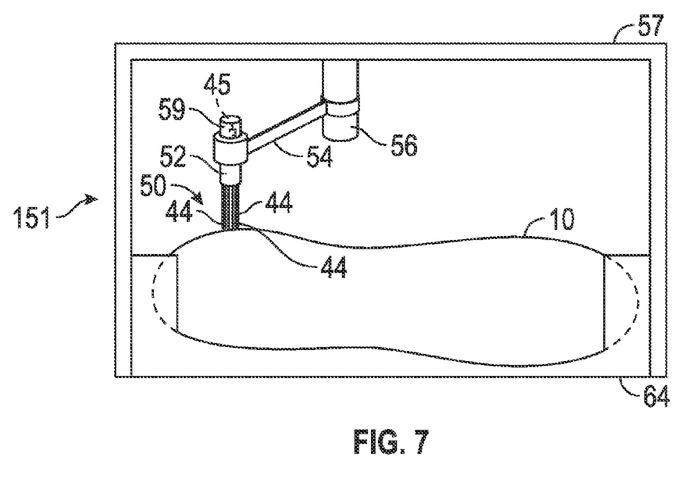
FIG. 7 is a schematic illustration in side view of the jig holding the bladder element while the cluster of piercing needles pierces the predetermined pattern.

After thermo-forming, the bladder element 10 is ready for optional pre-injection piercing, and ink injection. In step 208, the bladder element 10 is placed in a jig 64 of the apparatus 51 shown in FIG. 6. The jig 64 uses clamps or other mechanisms to hold the bladder element 10 to thereby maintain the correct positional relationship between the bladder element 10 and the piercing assembly, including the piercing needle 44, the needle housing 52 and the robotic arm 54. The jig 64 is fixed relative to the frame 57. Optional step 210 then begins, in which the predetermined pattern 48 is pierced in the wall 13 of the bladder element 10. Step 210 may include sub-step 212, in which the outline 46 of the predetermined pattern 48 is pierced with the first piercing needle 44 at a predetermined depth not greater than depth D3, and optionally a controlled rate of insertion, and force of insertion (or insertion pressure). FIG. 7 shows the alternate apparatus 151 having the cluster 50 of needles 44 carrying out step 210.

In sub-step 214, different respective portions of the predetermined pattern 48 may be pierced successively or simultaneously. In sub-step 216, if the portions are pierced successively, the piercing needle 44, the jig 64, or both, may be moved between piercings of the different respective portions to properly align the piercing needle 44 and the bladder element 10. For example, the piercing of the different respective portions of the example predetermined pattern 48 may be the "A", the "B", and the "C" of the example predetermined pattern 48. If multiple needles 44 or clusters of needles 44 are supported by different housings on the frame 57, in a similar manner as is illustrated with respect to needles 36 and housings 352 in FIG. 12, then the piercings of the portions of the predetermined pattern, or even piercings of different predetermined patterns of different graphical images can be carried out simultaneously.

Figure 8:
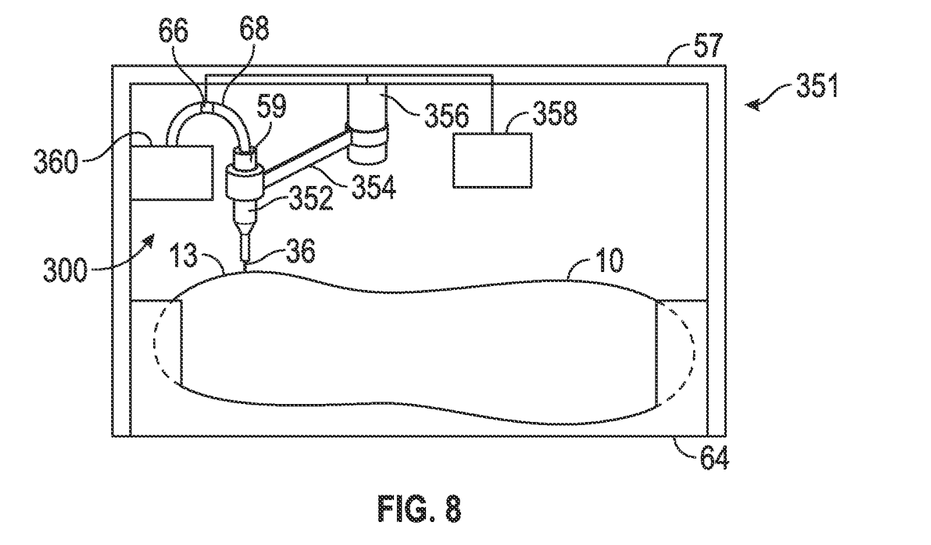
FIG. 8 is a schematic illustration in side view of the jig holding the bladder element while the injecting needle injects ink into the bladder element.

As shown in FIG. 8, the bladder element 10 is then held in an apparatus 351 for creating the graphical image on the bladder element 10. The apparatus 351 may include the same or a different jig 64 aligned with an ink injection assembly 300 that includes the ink injecting needle 36, and a needle housing 352 that is configured to allow ink to be supplied to the needle 36 from an ink source 360. The robotic arm 354 is controlled by a controller 358 that moves an actuator 356 according to a predetermined algorithm and the needle 36 is separately movable by the actuator 59 under the control of the electronic controller 358 to insert the needle 36 into the wall 13 in step 218 at a controlled needle insertion depth D, and, optionally, a controlled of predetermined rate of insertion, and force of insertion (or insertion pressure). The predetermined depth D of FIG. 2 ensures that, in step 220, the needle 36 injects the ink 34 into the outer layer 30 without compromising the barrier layer 33. Injection of the ink in step 220 may be at a controlled and/or predetermined rate of flow of ink. For example, FIG. 12 shows an apparatus 351A that further includes a flow valve 66 within an ink supply conduit 68. The flow valve 66 can regulate the rate of flow of the ink 34 to be at a predetermined flow rate, or can control the flow rate, such as under the control of controller 358. Optionally, multiple ink injection assemblies 300 may be controlled simultaneously in step 218 to establish multiple graphical images such as graphical image 15 and graphical image 15A. Multiple ink sources 360, 360A may be used so that the same or different colors of ink can be supplied to the needles 36. If necessary, any excess ink 34 on the outer surface 40 can be wiped in step 221 to ensure the surface 40 is free of ink 34, as discussed with respect to FIG. 13.

Figure 9:
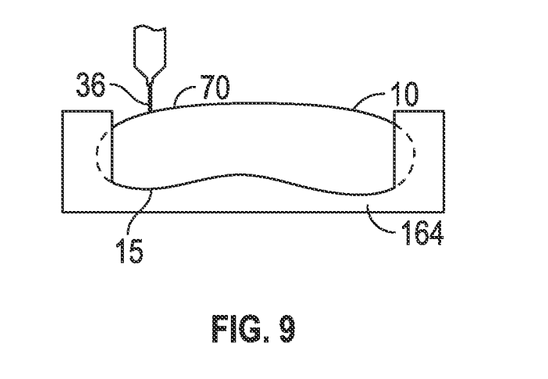
FIG. 9 is a schematic illustration in side view of the jig holding the bladder element after the bladder element is turned, and the injecting needle injecting ink to establish another graphical image.

After injection of the ink 34, the controller 358 determines in step 222 whether a predetermined ink drying time has elapsed. The determination can be made by the controller 358 starting a timer after the needle 36 is finally withdrawn from the wall 13 after completing injecting the ink at region 38. Optionally, if more than one graphical image is desired on the bladder element 10, then the bladder element 10 can be moved in step 224 after the predetermined time of step 222 has elapsed. This may include repositioning the bladder element 10 in the same or a different jig 164 as shown in FIG. 9 so that a different region 70 of the bladder element 10 is accessible to the the ink injecting needle 36, and to the piercing needle 44 or the cluster 50 of piercing needles 44 if piercing of a predetermined pattern is carried out prior to ink injection. Another predetermined pattern can then be pierced at the region 70 in step 226, at no more than depth D3, and optionally at the controlled rate of insertion and force of insertion (or pressure of insertion) as discussed with respect to steps 212 and 214. The ink injecting needle 36 can then be inserted into the bladder element 10 at the region 70 in step 228, and ink 34 can be injected through the needle 36 into the bladder element 10 in step 230 at the predetermined depth D, and optionally at a controlled rate of insertion, force of insertion (or insertion pressure), and ink flow rate as discussed with respect to steps 218 and 220.

Figure 10:
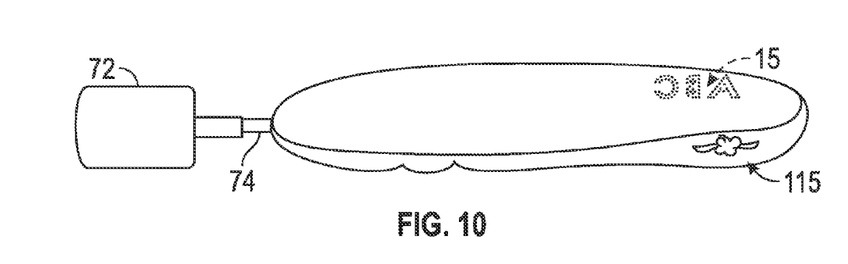
FIG. 10 is a schematic perspective illustration of the bladder element being inflated.

FIG. 9 shows the needle 36 injecting ink into a wall of the bladder element 10 at the region 70 to create the additional graphical image 115 of FIG. 10. The graphical image 115 is on the lateral side of the bladder element 10, generally opposite the graphical image 15, which is on the medial side. As used herein, a lateral side of a component for an article of footwear, such as a lateral side of the bladder element 10, is a side that corresponds with an outside area of the foot of the wearer of the article of footwear (i.e., the side closer to the fifth toe of the wearer). The fifth toe is commonly referred to as the little toe. A medial side of a component for an article of footwear is the side that corresponds with an inside area of the foot on which the article of footwear is worn (i.e., the side closer to the hallux of the foot of the wearer). The hallux is commonly referred to as the big toe.

In step 232, it is then determined whether a predetermined ink drying time has elapsed. The determination may be made by the the controller 358 starting a timer in a stored algorithm of a controller 358 after the needle 36 is withdrawn from the bladder element 10 after completely inserting ink at region 70, according to the algorithm. The bladder element 10 is then removed from the jig 64 in step 234. As discussed herein, optionally, inflation of the bladder element 10 in step 207 can occur after the ink injection steps 220, 230. FIG. 10 shows the bladder element 10 being inflated with a source 72 of pressurized air or other gas in fluid communication with the bladder element 10 through a tube 74 that is formed as part of the bladder element 10 in the thermoforming step 202. The tube 74 can then be trimmed and plugged to maintain pressurization of the inflated bladder element 10.

While the best modes for carrying out the disclosure have been described in detail, those familiar with the art to which this disclosure relates will recognize various alternative designs and embodiments for practicing the disclosure within the scope of the appended claims. It is intended that all matter contained in the above description or shown in the accompanying drawings shall be interpreted as illustrative only and not as limiting.

What is claimed is:

1. A method for manufacturing an article comprising:
   inserting at least one needle into a polymeric component that includes multiple layers and has a thickness; wherein the inserting is to a depth less than the thickness so that the needle does not penetrate entirely through the polymeric component;
   injecting ink into at least a portion of the polymeric component through the inserted needle so that the ink is embedded in at least one of the layers as a graphical image in the portion of the polymeric component;
   piercing a predetermined pattern in the polymeric component;
   wherein the inserting said at least one needle and the injecting ink through said at least one needle are after the piercing the predetermined pattern; and
   wherein the inserting said at least one needle is within the pierced, predetermined pattern.

2. The method of claim 1, wherein the inserting is at a controlled or predetermined rate of insertion of the needle.

3. The method of claim 1, wherein the inserting is at a controlled or predetermined pressure of the needle against the polymeric component.

4. The method of claim 1, wherein the injecting is at a controlled or predetermined rate of flow of the ink from the needle.

5. The method of claim 1, wherein the injecting is in the pierced, predetermined pattern.

6. The method of claim 1, wherein the injecting includes injecting multiple colors of ink.

7. The method of claim 6, wherein the injecting is of multiple colors of ink injected sequentially.

8. The method of claim 6, wherein said at least one needle includes multiple needles; and wherein the injecting is of multiple colors of ink injected simultaneously with the multiple needles at different portions of the polymeric component.

9. The method of claim 1, further comprising:
   inflating the polymeric component with a fluid.

10. The method of claim 9, wherein the inflating is prior to the injecting.

11. The method of claim 9, wherein the inflating is after the injecting.

12. The method of claim 1, further comprising:
    wiping the ink off of a surface of the polymeric component after the injecting.

13. The method of claim 1, further comprising:
    determining via a controller whether a predetermined ink drying time has elapsed after the injecting;
    moving the polymeric component only if said predetermined ink drying time has elapsed; and
    injecting ink into the polymeric component at a different region of the polymeric component through said at least one needle after moving the polymeric component.

14. The method of claim 1, further comprising:
    holding the polymeric component in a jig during the injecting;
    determining via a controller whether a predetermined ink drying time has elapsed after the injecting; and
    removing the polymeric component from the jig only if the predetermined ink drying time has elapsed.

15. The method of claim 1, further comprising:
    thermoforming the polymeric component as a bladder element for an article of footwear in a mold assembly;

determining via a controller whether a predetermined cooling time has elapsed after the thermoforming of the bladder element;

removing the thermoformed bladder element from the mold assembly only if the predetermined cooling time has elapsed; and wherein the inserting said at least one needle is after removing the thermoformed bladder element from the mold assembly.

16. The method of claim 15, further comprising:

inflating the bladder element after the thermoforming of the bladder element and prior to inserting said at least one needle.

17. The method of claim 15, further comprising:

inflating the bladder element after the inserting said at least one needle.

18. A method for manufacturing an article comprising:

inserting at least one needle into a polymeric component that includes multiple layers and has a thickness; wherein the inserting is to a depth less than the thickness so that the needle does not penetrate entirely through the polymeric component;

injecting ink into at least a portion of the polymeric component through the inserted needle so that the ink is embedded in at least one of the layers as a graphical image in the portion of the polymeric component;

determining via a controller whether a predetermined ink drying time has elapsed after the injecting;

moving the polymeric component only if said predetermined ink drying time has elapsed; and injecting ink into the polymeric component at a different region of the polymeric component through said at least one needle after moving the polymeric component.

19. The method of claim 18, further comprising:

thermoforming the polymeric component as a bladder element for an article of footwear in a mold assembly;

determining via a controller whether a predetermined cooling time has elapsed after the thermoforming of the bladder element;

removing the thermoformed bladder element from the mold assembly only if the predetermined cooling time has elapsed; and wherein the inserting said at least one needle is after removing the thermoformed bladder element from the mold assembly.

20. The method of claim 18, further comprising:

inflating the polymeric component with a fluid.

21. The method of claim 20, wherein the inflating is prior to the injecting ink into at least a portion of the polymeric component.

22. The method of claim 20, wherein the inflating is after the injecting ink into at least a portion of the polymeric component.

23. The method of claim 18, wherein the inserting is at a controlled or predetermined rate of insertion of the needle.

24. The method of claim 18, wherein the inserting is at a controlled or predetermined pressure of the needle against the polymeric component.

25. The method of claim 18, wherein the injecting ink into at least a portion of the polymeric component is in a predetermined pattern.

26. The method of claim 18, wherein the injecting ink into at least a portion of the polymeric component includes injecting multiple colors of ink sequentially.

27. The method of claim 18, further comprising:

holding the polymeric component in a jig during the injecting; and removing the polymeric component from the jig only if the predetermined ink drying time has elapsed.

28. A method for manufacturing an article comprising:

inserting at least one needle into a polymeric component that includes multiple layers and has a thickness; wherein the inserting is to a depth less than the thickness so that the needle does not penetrate entirely through the polymeric component;

injecting ink into at least a portion of the polymeric component through the inserted needle so that the ink is embedded in at least one of the layers as a graphical image in the portion of the polymeric component; and inflating the polymeric component with a fluid.

29. The method of claim 28, further comprising:

thermoforming the polymeric component as a bladder element for an article of footwear in a mold assembly;

determining via a controller whether a predetermined cooling time has elapsed after the thermoforming of the bladder element;

removing the thermoformed bladder element from the mold assembly only if the predetermined cooling time has elapsed; and wherein the inserting said at least one needle is after removing the thermoformed bladder element from the mold assembly.

30. The method of claim 28, wherein the inserting is at a controlled or predetermined rate of insertion of the needle.

31. The method of claim 28, wherein the inserting is at a controlled or predetermined pressure of the needle against the polymeric component.

32. The method of claim 28, wherein the injecting is at a controlled or predetermined rate of flow of the ink from the needle.

33. The method of claim 28, wherein the injecting is in a predetermined pattern.

34. The method of claim 28, wherein the injecting includes injecting multiple colors of ink sequentially.

35. The method of claim 28, wherein the inflating is prior to the injecting.

36. The method of claim 28, wherein the inflating is after the injecting.

* * * * *